United States Patent
Zheng et al.

(10) Patent No.: US 8,917,723 B2
(45) Date of Patent: Dec. 23, 2014

(54) METHOD, DEVICE, AND SYSTEM FOR PROCESSING IPV6 PACKET

(75) Inventors: Ruobin Zheng, Shenzhen (CN); Hongyu Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

(21) Appl. No.: 13/482,742

(22) Filed: May 29, 2012

(65) Prior Publication Data

US 2012/0236864 A1  Sep. 20, 2012

Related U.S. Application Data

(63) Continuation of application No. PCT/CN2010/079261, filed on Nov. 30, 2010.

(30) Foreign Application Priority Data

Dec. 7, 2009  (CN) .......................... 2009 1 0224093

(51) Int. Cl.
*H04L 12/28* (2006.01)
*H04L 29/12* (2006.01)
*H04L 29/06* (2006.01)

(52) U.S. Cl.
CPC ...... *H04L 29/12915* (2013.01); *H04L 61/2076* (2013.01); *H04L 61/2015* (2013.01); *H04L 61/6059* (2013.01); *H04L 63/20* (2013.01); *H04L 69/16* (2013.01); *H04L 69/22* (2013.01); *H04L 69/167* (2013.01)
USPC .......................................... 370/389; 709/219

(58) Field of Classification Search
CPC ............ H04L 61/2015; H04L 61/2076; H04L 61/6059
USPC ......... 370/241, 252, 331, 389, 390, 392, 401; 709/241, 252, 331, 389, 390, 392, 401
See application file for complete search history.

(56) References Cited

U.S. PATENT DOCUMENTS

2002/0100018 A1  7/2002  Click et al.
2003/0061599 A1  3/2003  Bates et al.
(Continued)

FOREIGN PATENT DOCUMENTS

CN    1838632 A    9/2006
CN    1863199 A    11/2006
(Continued)

OTHER PUBLICATIONS

Extended European Search Report issued in corresponding European Patent Application No. 10837002.4, mailed Nov. 13, 2012.

(Continued)

*Primary Examiner* — Ajay Cattungal
(74) *Attorney, Agent, or Firm* — Brinks Gilson & Lione

(57) ABSTRACT

The present disclosure discloses a method, device, and system for processing an IPv6 packet, and relates to the field of Internet technologies. According to the present disclosure, a secure access, authentication, and authorization can be ensured in an IPv6 network, and different IPv6 address prefixes are allocated to different terminals. Therefore, normal routing in the network is ensured. A method for processing an IPv6 packet provided in an embodiment of the present disclosure includes: an access node adds access line information to an IPv6 packet; and forwards the IPv6 packet that is added with the access line information to an IP edge node. The present disclosure is applicable to a scenario of processing a packet in an IPv6 network.

8 Claims, 6 Drawing Sheets

(56) References Cited

U.S. PATENT DOCUMENTS

| | | |
|---|---|---|
| 2004/0081102 A1* | 4/2004 | Russell Bennett ............ 370/252 |
| 2005/0149829 A1* | 7/2005 | Lee ............................... 714/776 |
| 2006/0193316 A1* | 8/2006 | Allen ............................ 370/389 |
| 2007/0300209 A1 | 12/2007 | Bates et al. |
| 2008/0072279 A1 | 3/2008 | Miao et al. |
| 2008/0159287 A1 | 7/2008 | Nagarajan et al. |
| 2008/0244090 A1 | 10/2008 | Zhu et al. |
| 2008/0298809 A1* | 12/2008 | Zheng ........................... 398/118 |
| 2009/0089431 A1* | 4/2009 | Kim et al. ..................... 709/226 |
| 2009/0238080 A1* | 9/2009 | Hirano et al. ................. 370/241 |
| 2009/0245250 A1* | 10/2009 | Kimura et al. ................ 370/390 |
| 2010/0290478 A1* | 11/2010 | Xia et al. ...................... 370/401 |
| 2013/0163558 A1* | 6/2013 | Chen ............................. 370/331 |
| 2013/0254436 A1* | 9/2013 | Chhabra et al. ................ 710/33 |

FOREIGN PATENT DOCUMENTS

| | | | |
|---|---|---|---|
| CN | 1897589 | A | 1/2007 |
| CN | 1937541 | A | 3/2007 |
| CN | 1972225 | A | 5/2007 |
| CN | 101047614 | A | 10/2007 |
| CN | 101569137 | A | 10/2009 |
| EP | 1909452 | A1 | 4/2008 |
| EP | 2249538 | A1 | 11/2010 |
| EP | 2424134 | A1 | 2/2012 |

OTHER PUBLICATIONS

Chinese Patent No. 102088391, issued on Sep. 11, 2013, granted in corresponding Chinese Patent Application No. 200910224093.5, 26 pages.

International Search Report and Written Opinion of the International Searching Authority issued in corresponding PCT Patent Application No. PCT/CN2010/079261, mailed Mar. 10, 2011.

Office Action issued in corresponding Chinese Patent Application No. 200910224093.5, mailed Apr. 28, 2012.

Extended European Search Report issued in corresponding European Patent Application No. 10835454.9, mailed Jun. 29, 2012.

Wen, "Port Identifier Option for RS/RA Messages in IPv6 Access Network" IETF IPv6 Working Group, Jun. 23, 2006.

Wen et al., "The Deployment of IPv6 Stateless Auto-Configuration in Access Network" International Conference on Telecommunications, ConTEL2005. Zagreb, Croatia, Jun. 15-17, 2005.

Li et al., "Line Identification in IPv6 Neighbour Solicitation Messages" IPv6 Maintenance WG, Jul. 6, 2009.

* cited by examiner

METHOD, DEVICE, AND SYSTEM FOR PROCESSING IPV6 PACKET

CROSS-REFERENCE TO RELATED APPLICATION

This application is a continuation of International Application No. PCT/CN2010/079261, filed on Nov. 30, 2010, which claims priority to Chinese Patent Application No. 200910224093.5, filed with the Chinese Patent Office on Dec. 7, 2009, both of which are incorporated herein by reference in their entireties.

FIELD

The present disclosure relates to Internet technologies, and in particular, to a method, device, and system for processing an IPv6 packet.

BACKGROUND

With the popularity of application of the Internet, users have higher and higher requirements on network bandwidth, and how to implement a high-speed and secure access based on existing resources has become a focal point of research in the industry. The digital subscriber line (Digital Subscriber Line, DSL) network gains much attraction because it has a large number of users on a huge telephone network.

FIG. 1 shows a schematic diagram of a common reference architecture of a DSL network. T is a reference point between a user equipment (User Equipment, UE) and a residential gateway (Residential Gateway, RG) in a customer premises network (Customer Premises Network, CPN); U is a reference point between an RG and an access node (Access Node, AN), for example, a digital subscriber line access multiplexer (Subscriber Line Access Multiplexer, DSLAM). The CPN network and the access network are interconnected by using the DSL access technology. In an access network, an aggregation network exists between an access node and a broadband remote access server (Broadband Remote Access Server, BRAS) or a broadband network gateway (Broadband Network Gateway, BNG); V is an Ethernet aggregation reference point between the AN and the BRAS/BG in the access network; A10 is a reference point between the access network and the service provider (Service Provider, SP), where the reference point may connect an application service provider (Application Service Provider, ASP) to a network service provider (Network Service Provider, NSP) that provides the access network, or connects the NSP to a visited access network in a roaming scenario. In different types of networks, specific devices and technologies may be different. For example, in a passive optical network (Passive Optical Network, PON), the AN may be an optical line termination (Optical Line Termination, OLT) or an optical network unit (Optical Network Unit, ONU). The CPN and the access network are interconnected by using access technologies such as PON.

The existing DSL network is generally constructed based on Internet Protocol version 4 (Internet Protocol Version 4, IPv4). With the exhaust of the IPv4 addresses, it is a definite trend of evolving from IPv4 to IPv6. However, at present, the performance IPv6 is not perfect in many aspects. For example, a secure access, authentication, and authorization cannot be ensured. Moreover, the network cannot identify the type of a user equipment. Consequently, a same IPv6 prefix is allocated to different users, which affects normal routing. This has become one of the urgent problems to be solved in the industry.

SUMMARY

To solve the problem in the prior art, embodiments of the present disclosure provide a method, device, and system for processing an IPv6 packet, which ensure a secure access, authentication, and authorization in an IPv6 network and allocate different IPv6 address prefixes to different terminals, ensuring normal routing of a network.

To achieve the above objective, the embodiments of the present disclosure use the following solution.

An embodiment of the present disclosure provides a method for processing an Internet Protocol version 6 IPv6 packet. The method includes: receiving, by an access node, an IPv6 packet from a terminal; adding, by the access node, access line information to the IPv6 packet; and forwarding, by the access node, the IPv6 packet added with the access line information to an IP edge node.

An embodiment of the present disclosure further provides a method for processing an Internet Protocol version 6, IPv6, packet. The method includes: receiving, by an IP edge node, an IPv6 packet that carries access line information from an access node; obtaining, by the IP edge node, the access line information from the IPv6 packet; and searching for a correspondence according to the access line information, so as to perform a corresponding operation on the IPv6 packet; where the access line information is added to the IPv6 packet by the access node.

An embodiment of the present disclosure further provides a network device. The device is configured to receive an Internet Protocol version 6, IPv6, packet from a terminal, and includes: an information adding unit, configured to add access line information to the IPv6 packet; and a forwarding unit, configured to forward the IPv6 packet to which the extension header adding unit adds the access line information to an IP edge node.

An embodiment of the present disclosure further provides a network server. The server includes: a receiving unit, configured to receive an Internet Protocol version 6 (IPv6) packet that carries access line information from an access node and obtain the access line information from the IPv6 packet; and a processing unit, configured to search for a correspondence according to the access line information, so as to perform a corresponding operation on the IPv6 packet; where the access line information is added to the IPv6 packet by the access node.

An embodiment of the present disclosure further provides an IPv6 network system. The system includes a terminal, an access node and an IP edge node.

The terminal is configured to send an IPv6 packet to the access node.

The access node is configured to add access line information to the IPv6 packet; and forward the IPv6 packet added with the access line information to the IP edge node.

The IP edge node is configured to receive the IPv6 packet that carries the access line information; and search for a correspondence according to the access line information, so as to perform a corresponding operation on the IPv6 packet.

According to the solution provided in the embodiments of the present disclosure, the IPv6 packet carries the access line information and/or the vendor information, so that the device receiving the IPv6 packet can perform access, authentication, and authorization of the IPv6 packet by using the access line information and/or vendor information, or allocate different IPv6 address prefixes to different terminals. According to the solution of the embodiments of the present disclosure, a secure access, authentication, and authorizations can be ensured in an IPv6 network, and different IPv6 address prefixes are allocated to different terminals. Therefore, normal routing of a network is ensured.

BRIEF DESCRIPTION OF THE DRAWINGS

To make the solution of the embodiments of the present disclosure or the prior art clearer, the accompanying drawings for illustrating the embodiments of the present disclosure are briefly introduced below. Apparently, the accompanying drawings in the following description are merely some embodiments of the present disclosure, and persons of ordinary skills in the art may further derive other drawings according to these accompanying drawings without creative efforts.

DETAILED DESCRIPTION OF THE EMBODIMENTS

The solution disclosed in embodiments of the present disclosure is clearly and fully described below with reference to the accompanying drawings in the embodiments of the present disclosure. Evidently, the embodiments to be described are merely a part rather than all of the embodiments of the present disclosure. All other embodiments derived by persons of ordinary skills in the art based on the embodiments of the present disclosure without creative efforts should fall within the protection scope of the present disclosure.

Figure 1:
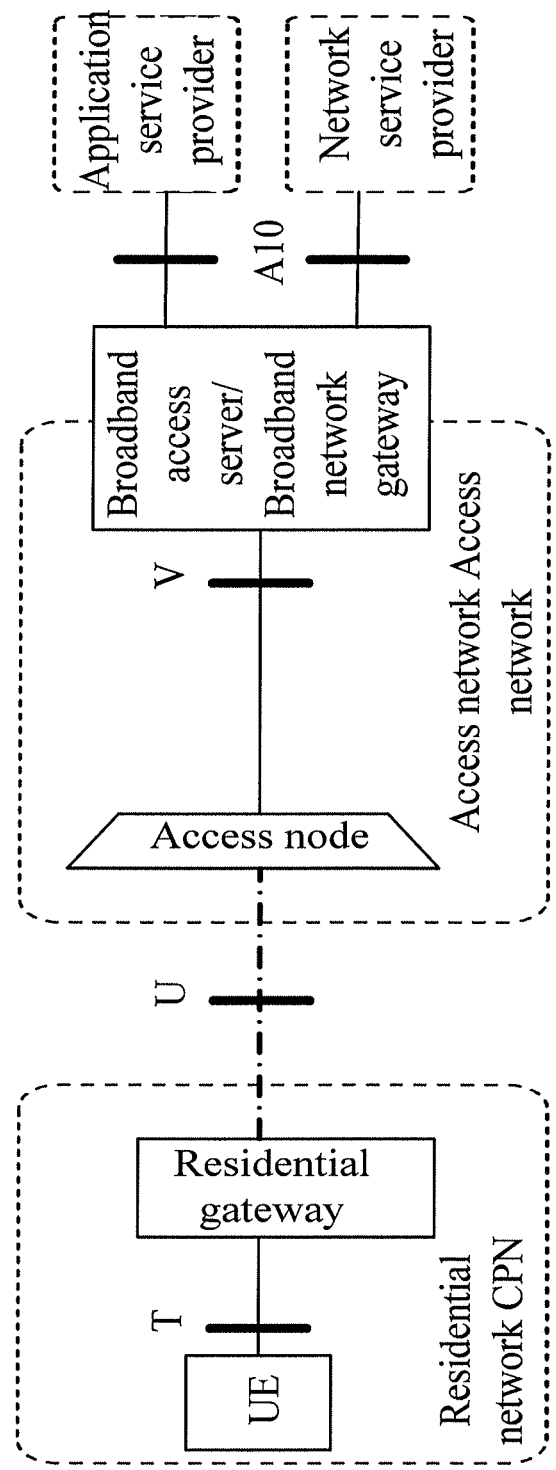
FIG. 1 is a schematic diagram of a common reference architecture of an IPv4-based DSL network.
Figure 2:
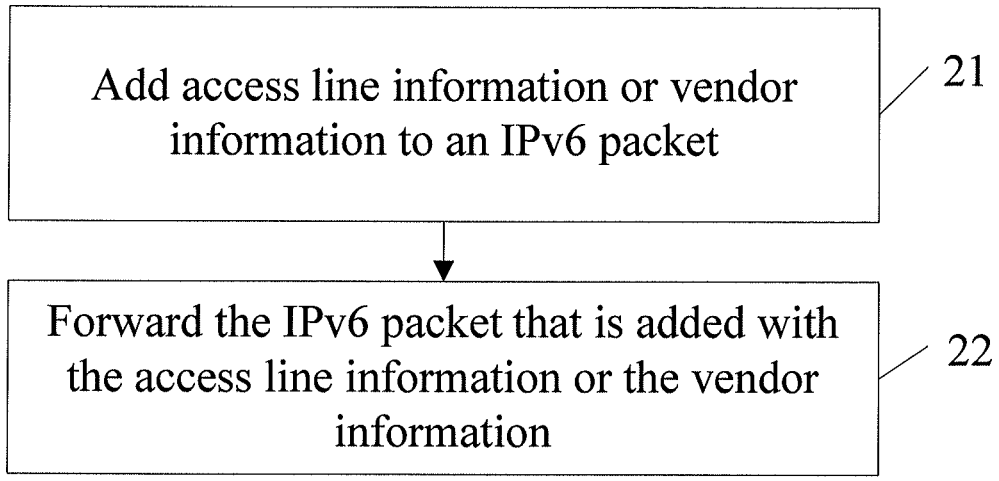
FIG. 2 is a schematic flowchart of a method for processing an IPv6 packet according to a first embodiment of the present disclosure.

A method for processing an IPv6 packet provided by an embodiment of the present disclosure is as shown in FIG. 2, and the method includes the following:

Step 21: Add access line information or vendor information to an IPv6 packet.

Step 22: Forward the IPv6 packet added with the access line information or the vendor information.

In the embodiment of the present disclosure, the above access line information includes an access loop identification (Access Loop ID, ALI) or other required access line information. The above access line information or vendor information may be added to the IPv6 packet by adding an extension header. The extension header may use a newly added extension header or an existing extension header, for example, using a hop-by-hop options header (Hop-by-Hop Options Header) to carry the access loop identification. It may be required that the information carried in the above extension header be checked and processed by each node on the path which the information passes through. When the IPv6 packet is an Internet Control Message Protocol (Internet Control Message Protocol Version 6, ICMPv6) message, the ICMPv6 message may also be borne in an ICMPv6 relay message, and the access line information may be added to the ICMPv6 relay message, so that the access line information is added to the Ipv6 packet.

When a manner of adding an extension header is used, a first IPv6 extension header having the access loop identification, or called as an access loop identification extension header, is added to the IPv6 packet. In addition to the above access loop identification, the first IPv6 extension header may further include other required information, for example, a next header (Next Header) and the length of an extension header (Hdr Ext Len).

To clearly describe the solution of the embodiments of the present disclosure, in the embodiments of the present disclosure, the wordings such as "first" and "second" are used to distinguish items that have the same functions and effects or similar functions and effects. Those skilled in the art may understand that, the wordings such as "first" and "second" do not limit the number of items or the sequence of action execution.

The adding the access line information to the IPv6 packet may be implemented by a relay agent function. The relay agent function may be located on an access node or IP edge node of an access network, or located on both the access node and IP edge node at the same time. The relay agent function obtains the access line information from the corresponding network device. For example, the access node or IP edge node saves the access line information, such as the access loop identification, and the relay agent function obtains the access loop identification from the access node and/or IP edge node. The relay agent function may add an extension header of the access loop identification to the IPv6 packet, or bear the ICMPv6 message in the ICMPv6 relay message, so as to add the access line information to the IPv6 packet. The access line information may be used to ensure a secure access, authentication, and authorization, or allocate the IPv6 address prefix to a terminal.

Further, after the relay agent function adds a first IPv6 extension header to the IPv6 packet, the method further includes: receiving, by a second relay agent function, the IPv6 packet that includes the first IPv6 extension header; and deleting, by the second relay agent function, the first IPv6 extension header in the IPv6 packet, and forwarding the IPv6 packet.

The second relay agent function and the above relay agent function may be relay agent functions that are located on different network devices. For example, the above relay agent function is a relay agent function located on an ONU, and the second relay agent function is a relay agent function located on an OLT.

The above vendor information includes a vendor class identification (Vendor Class ID) and other required vendor information. A terminal saves its own vendor information. When a manner of adding an extension header is used, the terminal adds a second IPv6 extension header having the vendor class identification, or called as a vendor class identification extension header, to the IPv6 packet. In addition to the vendor class identification, the second IPv6 extension header may further include other required information, for example, a next header and the length of an extension header.

The above vendor information may be used to ensure a secure access, authentication, and authorization, or allocate the IPv6 address prefix to the terminal.

According to the solution provided by the embodiment of the present disclosure, the access line information and/or the vendor information are carried in the IPv6 extension header by adding the IPv6 extension header to the IPv6 packet, or the ICMPv6 message and the access loop identification are borne in the ICMPv6 relay message, so that the device receiving the IPv6 packet can access, authenticate, and authorize the IPv6 packet by using the access loop information, and/or allocate different IPv6 address prefixes to different terminals by using the vendor information.

According to the solution of the embodiment of the present disclosure, a secure access, authentication, and authorizations can be ensured in an IPv6 network, and different IPv6 address prefixes are allocated to different terminals. Therefore, normal routing of a network is ensured.

Figure 3:
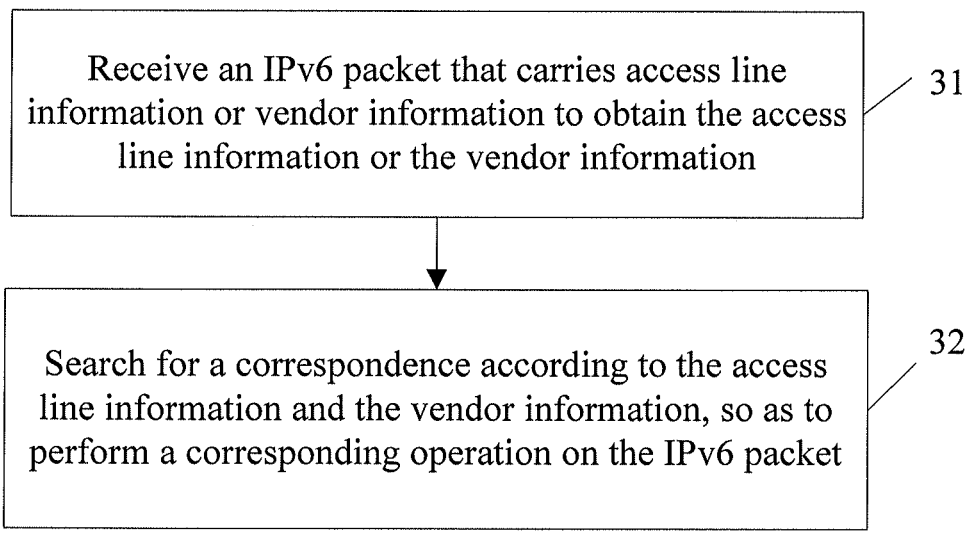
FIG. 3 is a schematic flowchart of a method for processing an IPv6 packet according to a second embodiment of the present disclosure.

An embodiment of the present disclosure provides a method for processing an IPv6 packet. As shown in FIG. 3, the method includes the following:

Step 31: Receive an IPv6 packet that carries access line information or vendor information to obtain the access line information or the vendor information.

Step 32: Search for a correspondence according to the access line information or the vendor information, so as to perform a corresponding operation on the IPv6 packet.

Further, in step 31, the IPv6 packet having at least one IPv6 extension header may be received. The IPv6 extension header carries the access line information or the vendor information. The access line information or the vendor information is obtained according to the IPv6 extension header; or the IPv6 packet that bears the ICMPv6 message is received. The IPv6 packet bears the ICMPv6 message and the access line information by using the ICMPv6 relay message, and the access line information is extracted from the ICMPv6 relay message.

Steps 31 and 32 may be implemented by a network server or a network device that has a same function. Specific devices used to perform the above operations in different network architectures may be different. For example, the network device may be an OLT in a PON, and may also be an IP edge node. In step 32, the correspondence that is searched for based on different extension headers may be different, and the operations performed may also be different. Such correspondence may be saved and maintained by the OLT or the IP edge node, or may be saved and maintained by another device in the network. The OLT or the IP edge node obtains the required correspondence from the device when performing step 32. For example, when the above IPv6 extension header is a first IPv6 extension header that carries an access loop identification, a first correspondence maintained is searched for, so as to perform access, authentication, or authorization of the IPv6 packet. The first correspondence is a correspondence that is required when access, authentication, or authorization is implemented by using the access loop identification. For example, the first correspondence may be a correspondence between an access loop identification and a packet which is allowed to access the network or passes the authentication, or authorized, such as, the access loop multicast permission table in a multicast scenario. For example, in the multicast scenario, based on the IPv6 extension header that carries the access line information, an access loop multicast permission table is searched to judge whether the access is allowed; if yes, the access is allowed; if no, the access is denied.

When the IPv6 extension header is a second IPv6 extension header that carries a vendor class identification, a second correspondence maintained is searched for, so as to allocate an IPv6 address prefix to the IPv6 packet. The second correspondence is a correspondence that is required when IPv6 address allocation of a terminal is implemented by using the vendor class identification. For example, the second correspondence is a correspondence between the vendor class identification and the IPv6 address prefix that allows to be allocated.

According to the solution provided by the embodiments of the present disclosure, access, authentication, and authorization of the IPv6 packet can be performed by using the access line information and/or the vendor information in the IPv6 packet, or different IPv6 address prefixes can be allocated to different terminals. According to the solution of the embodiment of the present disclosure, a secure access, authentication, and authorizations can be ensured in an IPv6 network, and different IPv6 address prefixes are allocated to different terminals. Therefore, normal routing of a network is ensured.

The following illustrates the method for processing the IPv6 packet according to a third embodiment of the present disclosure in detail.

In the embodiment of the present disclosure, it is taken as example that a scenario where a new access loop identification extension header (hereinafter referred to as a first IPv6 extension header) and/or a new vendor class identification extension header (hereinafter referred to as a second IPv6 extension header) are added for description. An access loop identification and/or a vendor class identification information may also be carried in an existing IPv6 extension header. It may be understood that, those skilled in the art may acquire other similar methods for processing the IPv6 extension header from the following description.

Access Loop Identification Extension Header

A relay agent function implements addition or deletion of an access loop identification extension header. The relay agent function is capable of processing the IPv6 extension header, and the relay agent function may be located on an access node or an IP edge node in an access network. The following takes a case where the relay agent function is located on the access node and the IPv6 packet is an Internet Control Message Protocol (Internet Control Message Protocol, ICMP) packet as an example for illustration. A process of adding a new IPv6 extension header mainly includes the following processing:

As shown in Table 1, an IPv6 packet added with no access loop identification extension header before the IPv6 packet passes through the access node is illustrated. Referring to Table 2, an IPv6 packet to which the access node adds an access loop identification extension header is illustrated. The access node directly adds the access loop identification extension header to the IPv6 packet. A next header (Next Header) of the IPv6 header indicates that the subsequently carried IPv6 extension header is used to bear the access loop identification information, and may be expressed as Next Header=Access Loop ID.

TABLE 1

| IPv6 header (IPv6 Header) Next Header = ICMP | ICMP message (ICMP Message) |
| --- | --- |

TABLE 2

| IPv6 header (IPv6 Header) Next Header = Access Loop ID | Access loop identification extension header (Access Loop ID Header) Next Header = ICMP | ICMP message (ICMP Message) |
|---|---|---|

The access node may add an access loop identification extension header to an IPv6 packet after receiving the IPv6 packet, so as to bear the access loop identification information. The access node may also add the Access Loop ID extension header only when forwarding the IPv6 packet. The IPv6 packet may be the message such as a router solicitation (Router Solicitation, RS) message, a router advertisement (Router Advertisement, RA) message, a neighbor solicitation (Neighbor Solicitation, NS) message, a neighbor advertisement (Neighbor Advertisement, NA) message, or a multicast listener discovery (Multicast Listener Discovery, MLD) message, Table 3 shows a specific structure of an access loop identification extension header, including, but not limited to, a Next Header, the length of an extension header, an access loop type (Access Loop Type), and an access loop identification. The specific structure of the extension header may be adjusted. For example, optionally, the extension header may also not carry information of the access loop type whereas the access node may acquire the access loop type according to the context in the network.

TABLE 3

| | 31-24 bit | 23-16 bit | 15-8 bit | 7-0 bit |
|---|---|---|---|---|
| 0 | Next Header | Length of extension header (Hdr Ext Len) | Access loop type (Access Loop Type) | Access Loop Identification |
| . | | Access loop identification (Access Loop ID) | | |
| . | | | | |
| . | | | | |
| n | | | | |

Exemplarily, as shown in FIG. 3, the access loop identification extension header includes 32×n bits. Bits 24 to 31 in the first row are allocated to the Next Header; bits 16 to 23 in the first row are allocated to the length of the extension header; bits 8 to 15 in the first row are allocated to the access loop type, where the access loop type mat be DSL, passive optical network (PON), or Ethernet (Ethernet); and the remaining bits are reserved for the access loop identification.

The access loop identification may include an agent circuit identification (Agent Circuit ID) and/or an agent remote identification (Agent Remote ID).

For different access loop types, coding formats of the access loop identification may be different.

For example, when the access loop type is DSL and the access node is a DSLAM, the coding format of the access loop identification is as follows:
{atm|eth}
AccessNodeIdentification/ANI_ack/ANI_frame/ANI_slot/ANI_subslot/
ANI_port[:ANI_XPI.ANI_XCI]
Description:
ASCII code is used for coding.
atmeth: port type, an ATM-based DSL port|a DSL-based Ethernet port
AcessNodeIdentification: access node identification (for example, a DSLAM device); it is a string not longer than 50 characters without spaces ANI_rack: rack number of the access node (for example, a DSLAM device supporting tight coupling), 0-15
ANI_frame: frame number of the access node, 0-31
ANI_slot: slot number of the access node, 0-127
ANI_subslot: sub-slot number of the access node, 0-31
ANI_port: port number of the access node, 0-225
ANI_XPI: optional; if the interface type is atm, XPI corresponds to VPI and ranges from 0 to 255; if the interface type is eth, XPI corresponds to PVLAN and ranges from 0 to 4095
ANI_XCI: if the interface type is atm, XCI corresponds to VCI and ranges from 0 to 65535; if the interface type is eth, XPI corresponds to CVLAN and ranges from 0 to 4095
ANI_XPL.ANI_XCI is mainly used to carry service information on a CPE side, identifying the further service type requirement, for example, identifying specific services in a multi-PVC scenario.

A space is used in between the character strings, and no space exists in the character string. Content in the braces { } is mandatory. The vertical bar | indicates a parallel relationships, and indicates selecting one from multiple. The brackets [ ] indicates optional content. Some devices do not involve the concepts such as rack, frame, and sub-slot, and 0 needs to be padded in the corresponding position.

If the interface type is ATM, 0 may be filled in domains AccessNodeIdentification, ANI_rack, ANI_frame, ANI_slot, ANI_subslot, and ANI_port.

If the operator does not use the SVLAN technology, XPI=4096 and XCI=VLAN, ranging from 0 to 4095.

If the operation does not use the VLAN technology to separate users (user PC is directly connected to the BAS port), XPI=4096 and XCI=4096.

For example, when the access loop type is PON and the access node is an optical network unit/optical line termination (ONU/OLT), the coding format of the access loop identification is as follows:
AccessNodeIdentification/ANI_ack/ANI_frame/ANI_slot/ANI_subslot/ANI_port/ONU_ID
[ONU_Slot/ONU_Subslot/PortID][:{atm/eth|trk}/Port_XPI.Port_XCI]
[LN|EP|GP]
Description:
ASCII code is used for coding.
In the above format, each line indicates a character string. A space is used in between the character strings, and no space exists in the character string.
"{ }" indicates that the content therein is mandatory. "|" indicates a parallel relationships, and indicates selecting one from multiple. "[ ]" indicates that the content therein is optional. "{ }", "|", and "[ ]" are not used in the coding. "/", ":", and "." are reserved characters, and can be directly coded.
AccessNodeIdentification: access node identification (for example, an OLT device); it is a string not longer than 50 characters without spaces. The method for identifying the access node device is not specified.
ANI_rack: rack number of the access node (for example, an OLT device supporting tight coupling), 0-15
ANI_frame: frame number of the access node, 0-31
ANI_slot: slot number of the access node, 0-127
ANI_subslot: sub-slot number of the access node, 0-31
ANI_port: port number of the access node, 0-225
ONU_ID: identification of the ONU; it is a string of 24 characters. The method for identifying the ONU is not specified (the MAC address of the ONU may be used, for example, 0000000000001A2B3C4D5E6F; or the logic identification of the ONU may be used, for example, SH_EPON_0000000098765432, where "SH" indicates Shanghai, "EPON" indicates an EPON ONU, and "00000098765432"

is the sequence number of the ONU); if the ONU is an SFU, HGU, or SBU, the fields that follow ONU_ID are not included.

ONU_Slot: slot number of the MDU/MTU type ONU, 0-15

ONU_Subslot: sub-slot number of the MDU/MTU type ONU, 0-15

Port_ID: port number of the MDU/MTU type ONU, 0-128 atm|eth|trk: ONU user port type; atm indicates the DSL port that uses the ATM protocol (for example, an ADSL2+); eth indicates a common Ethernet port; and trk indicates an Ethernet port of a trunk-type; and the VDSL2 port using the PTM mode is should be an eth or trk type port.

Port_XPI.Port_XCI is mainly used to carry user side service information on an MDU/MTU type ONU port on DSL interface, identifying the further service type requirement, for example, identifying specific services in a multi-PVC or multi-VLAN scenario.

Port_XPI: optional; if the interface type of the ONU is DSL, Port_XPI corresponds to the VPI of the interface, XPI ranges from 0 to 255; if the interface type of eth or trk, Port_XPI corresponds to SVLAN, with a valid value ranging from 0 to 4095 (4096 indicates no SVLAN).

Port_XCI: optional; if the interface type of the ONU is DSL, Port_XCI corresponds to the VCI of the interface, XCI ranges from 0 to 65535; if the interface type of eth or trk, Port_XCI corresponds to SVLAN, with a valid value ranging from 0 to 4095.

LN|EP|GP: indicates the access technology used by the user; LN indicates the LAN access; EP indicates EPON technology; and GP indicates the GPON technology.

Some devices do not involve the concepts such as rack, frame, and sub-slot, and 0 needs to be padded in the corresponding position. The invalid VLAN ID should be replaced with 4096.

If the operator does not use the SVLAN technology, SVLAN=4096, and the CVLAN value is the user VLAN ID, ranges from 0 to 4095.

If the operation does not use the VLAN technology to separate users (user PC is directly connected to the BAS port), SVLAN=4096 and CVLAN=4096.

When the access loop type is ETHernet, and the access node is an Ethernet switch, the broadband subscriber access loop (port) in a LAN system uses the information coding format of the broadband subscriber access loop (port) in a PON system. The coding format of the access loop identification is as follows:

AccessNodeIdentification/ANI_ack/ANI_frame/ANI_slot/ANI_subslot/ANI_port/ONU_ID

ONU_Slot/ONU_Subslot/Port_ID:{atm|eth|trk|hyd}/Port_XPI.Port_XCI

{LN|EP|GP}

Description:

ASCII code is used for coding.

In the above format, each line indicates a character string. A space is used in between the character strings, and no space exists in the character string.

"{ }" indicates that the content therein is mandatory. "|" indicates a parallel relationships, and indicates selecting one from multiple. "[ ]" indicates that the content therein is optional. "{ }", "|", and "[ ]" are not used in the coding.

"/", ":", and "." are reserved characters, and can be directly coded.

AccessNodeIdentification: access node identification (for example, a corridor switch device); it is a string not longer than 50 characters without spaces. The method for identifying the access node device is not specified.

ANI_rack: rack number of the access node (for example, a corridor switch supporting tight coupling), 0-15

ANI_frame: frame number of the access node, 0-31

ANI_slot: slot number of the access node, 0-127

ANI_subslot: sub-slot number of the access node, 0-31

ANI_port: port number of the access node, 0-225

ONU_ID: identification of the corridor switch; it is a 24-character string. The method for identifying the corridor switch is not specified (for example, the network management IP address of the corridor switch may be used, and the sequence number of the corridor switch in the resource management system may also be used).

ONU_Slot: slot number of the corridor switch, 0-15

ONU_Ssubslot: sub-slot number of the corridor switch, 0-15

Port_Slot: slot number of the corridor switch, 0-128 {atm/eth|trk|hyd}: type of the user port on the corridor switch; in a LAN access network, in Option82 for IPTV address allocation, the value of this field is "trk" or "hyd", where "trk" indicates a Trunk-type Ethernet port (the same port may carry a PPPoE Internet service); "hyd" identifies a Hybrid-type Ethernet port (the Internet service on the UNI interface on the corridor switch is untagged, and is tagged with VLAN Tag by the corridor switch; and the IPTV service is tagged).

Port_XPI: the current value of this field is universally 4096 (indicating no SVLAN).

Port_XCI: corresponds to the IPTV service VLAN, with a valid value ranging from 0 to 4095.

LN|EP|GP: indicates the access technology used by the user; the value of this field is "LN" in a LAN system.

Some devices do not involve the concepts such as rack, frame, and sub-slot, and 0 needs to be padded in the corresponding position. The invalid VLAN ID should be set as 4096.

If the operator does not use the SVLAN technology, SVLAN=4096, and the CVLAN value is the user VLAN ID, ranges from 0 to 4095.

If the operation does not use the VLAN technology to separate users (user PC is directly connected to the BAS port), SVLAN=4096 and CVLAN=4096.

Further, in this embodiment of the present disclosure, the above relay agent function may include multiple levels of relay agents. Each level of relay agent can add or delete a current level IPv6 extension header, so as to add or delete information of a current level access loop identification. Each level of relay agent may add the current level access identification extension header to the IPv6 packet in the following modes:

the current level relay agent directly adds the current level access loop identification ex tension header after the upper level access loop identification extension header, where a Next Header in the upper level access loop identification extension header is set to the current level access loop identification extension header; or the current level relay agent modifies the upper level access loop identification extension header, and adds the current level access loop identification to the access loop identification of the upper level access loop identification extension header, without adding a new IPv6 extension header.

For each level of relay agent or for different IPv6 packets processed by a relay agent, either of the above modes may be selected to add the current level access loop identification extension header.

The relay agent function forwards the IPv6 packet after adding the access loop identification extension header to the IPv6 packet. When the relay agent function receives the IPv6 packet that includes the access loop identification extension header, if necessary, for example, considering the factors such as network security, the relay agent function may delete the access loop identification extension header from the IPv6 packet, and then forward the IPv6 packet to a network device.

When the relay agent function has multiple levels of relay agents, the relay agent function may delete the access loop identification extension headers one by one as required. For example, the extension headers are deleted according to the sequence that the extension headers are added; the access loop identification extension headers are deleted layer by layer based on the principle that the packet to which an extension header is added latest is deleted first. Also, the position and the number of bits of the access loop identification extension header that needs to be deleted may be set, and the extension header added first but requiring a first deletion is deleted directly. In the case where one access loop identification extension header carries multiple access loop identifications, the relay agent function deletes the access loop identifications one by one.

When receiving an IPv6 packet that carries at least one access loop identification extension header, the network server searches for a first mapping according to the access loop identification extension header, so as to perform a corresponding operation on the IPv6 packet. For example, the first mapping may be an access loop multicast permission table, and the network server queries in the access loop multicast permission table according to the access loop identification carried in the extension header and judges whether a multicast operation is allowed.

Vendor Class Identification Extension Header

When a terminal initiates an IPv6 packet, a vendor class identification (Vendor Class ID) extension header is added to the IPv6 packet. A next header in the IPv6 packet of the IPv6 header indicates that the subsequently carried IPv6 extension header is the vendor class identification extension header. The vendor class identification extension header includes a Next Header, the length of an extension header, and a vendor class identification. The vendor class identification indicates the type of the terminal, including a vendor class option (Vendor Class Option).

Referring to Table 4, an IPv6 packet added with the vendor class identification extension header is illustrated.

TABLE 4

| IPv6 header (IPv6 Header) Next Header = Vendor Class ID | Vendor class identification extension header (Vendor Class ID Header) Next Header = ICMP | ICMP message (ICMP Message) |
|---|---|---|

TABLE 5

| 31-24 bit | 23-16 bit | 15-0 bit |
|---|---|---|
| 0 Next Header | Length of extension header (Hdr Ext Len) | Vendor Class Identification |
| . . . n | Vendor class identification (Vendor Class ID) | |

Figure 5:
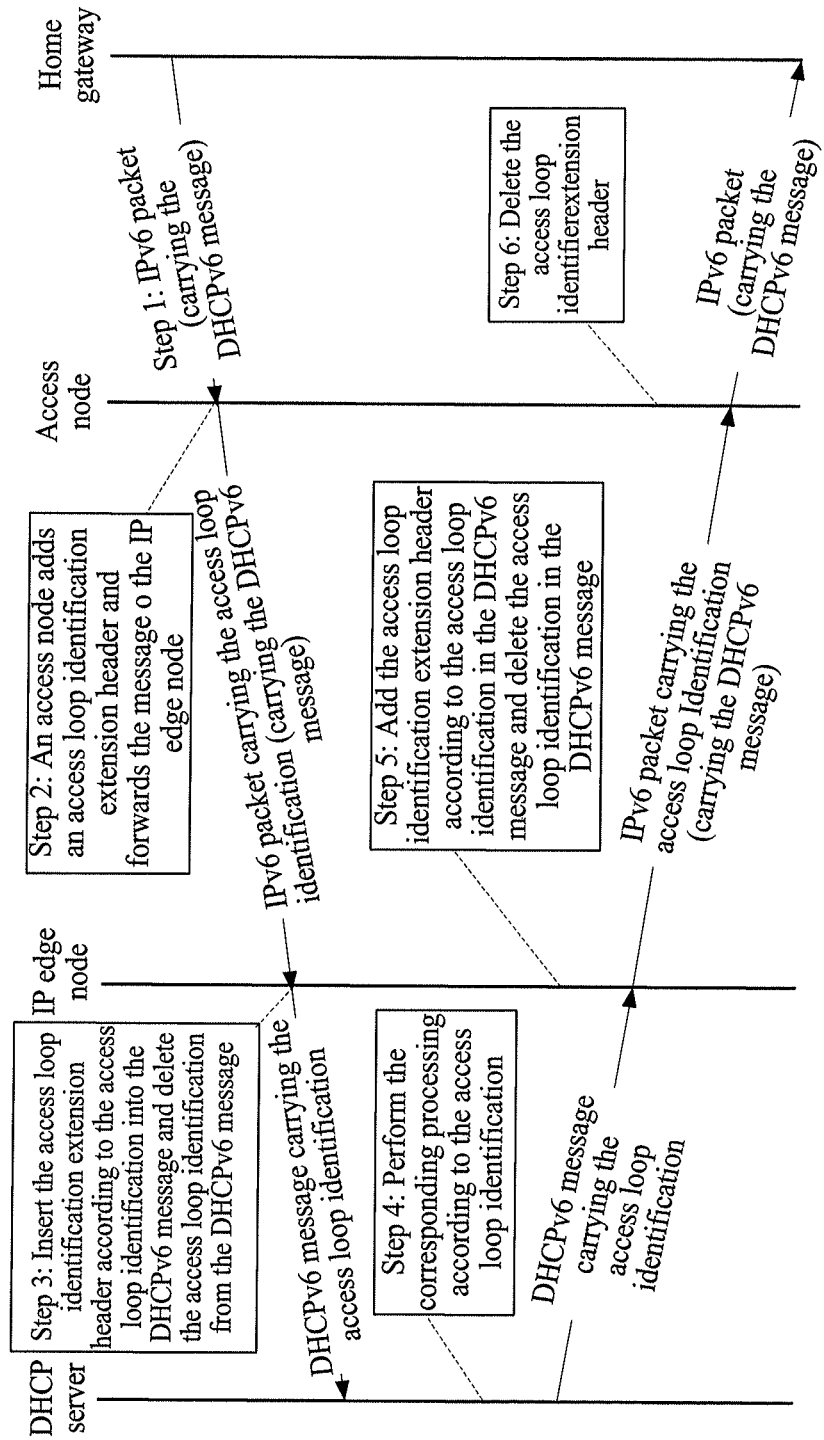
FIG. 5 is a schematic flowchart of a method of a case where an access node adds an access loop identification extension header to a DHCP message according to a third embodiment of the present disclosure.

Referring to FIG. 5, a structure of the vendor class identification extension header is illustrated. Exemplarily, as shown in FIG. 5, the vendor class identification extension header includes 32×n bits. Bits 24 to 31 in the first row are allocated to the Next Header; bits 16 to 23 in the first row are allocated to the length of the extension header; and the remaining bits are reserved for the vendor class identification.

The user terminal sends the IPv6 added with the vendor class identification to the network. The device in the network transparently transmits the packet. The IP edge node may identify the type of the user terminal and the type of user services according to the vendor class identification extension header in the packet. The IP edge node searches for the second correspondence that is maintained by using the vendor class identification, and allocates different IPv6 address prefixes to different services of the user terminal. For example, the IP edge node queries the correspondence between the terminal type and the address prefix according to the acquired terminal type, and allocates an IPv6 address prefix to the packet.

Figure 4:
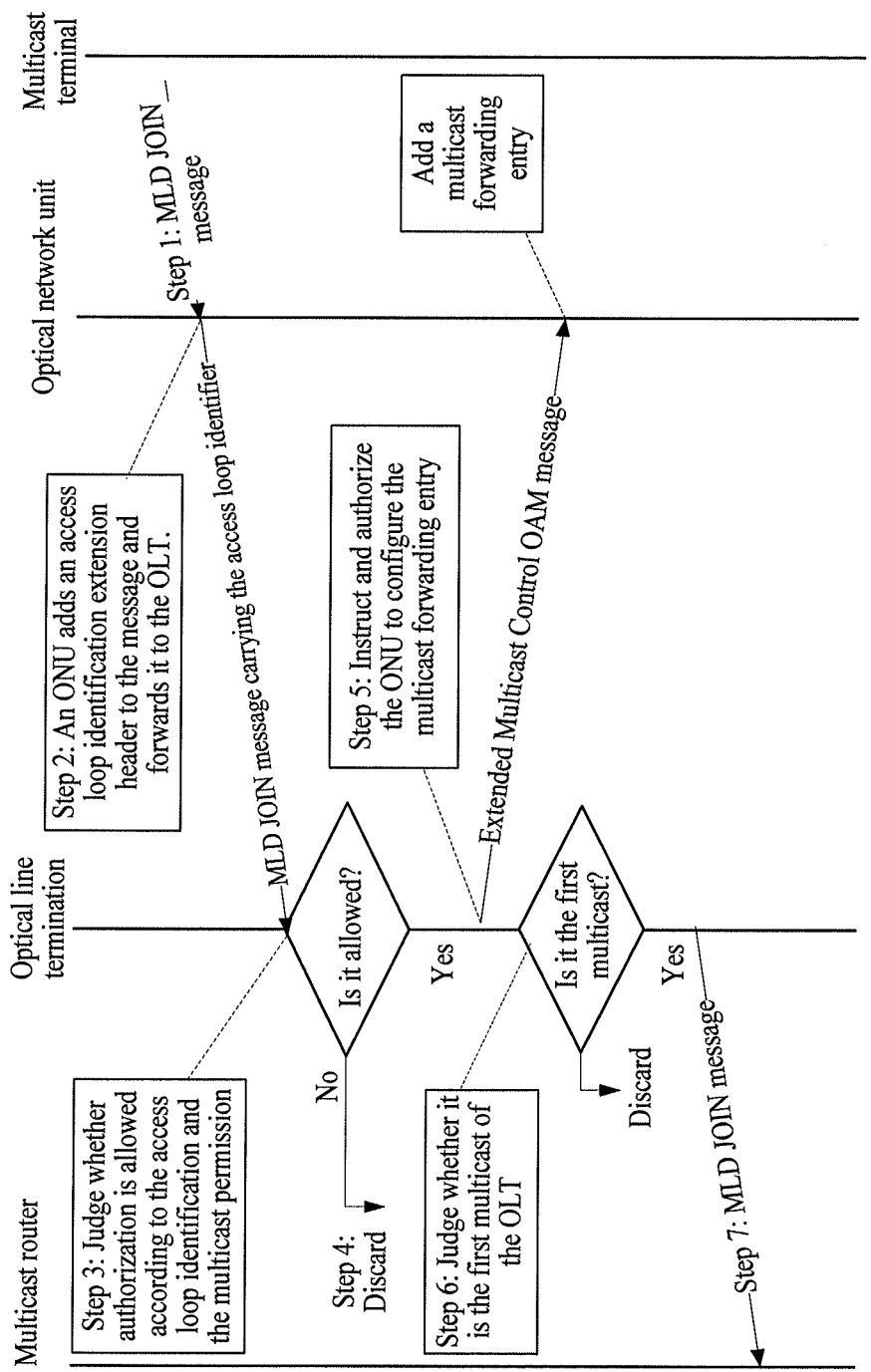
FIG. 4 is a schematic flowchart of a method for performing multicast by using an access loop identification extension header in a PON system according to a third embodiment of the present disclosure.

Referring to FIG. 4, a method for using an access loop identification extension header to perform multicast in a PON system according to an embodiment of the present disclosure is described in the following.

Step 1: A multicast terminal (Multicast Terminal) sends a multicast listener discovery join (MLD JOIN) message to an ONU.

Step 2: The ONU adds an access loop identification extension header to the IP packet where the received MLD JOIN message is located, where the access loop identification extension header carries an access loop identification (ALI). The ONU forwards the MLD JOIN message to an OLT.

Step 3: The OLT judges, according to the ALI and the access loop multicast permission table, whether the MLD JOIN message can be authorized.

The OLT maintains the access loop multicast permission table that corresponds to each access loop. The OLT queries in the access loop multicast permission table according to the access loop identification.

Step 4: If the corresponding access loop does not allow the multicast address requested by the MLD JOIN message, the OLT discards the MLD JOIN message.

Step 5: If the corresponding access loop allows the multicast address requested by the MLD JOIN message, the OLT uses the operations, administration and maintenance (Operations Administration and Maintenance, OAM) or optical network unit management and control interface (ONU Management and Control Interface, OMCI) protocol sends an extended multicast control OAM (Extended Multicast Control OAM) message to instruct and authorize the ONU to configure the corresponding multicast forwarding entry (Multicast Entry).

Step 6: Referring to FIG. 4, in the scenario, the process that the corresponding access loop allows the multicast address requested by the MLD JOIN message further includes: judging whether it is the first time that the multicast address requested by the MLD JOIN message appears on the OLT.

Step 7: If it is the first time that the multicast address requested by the MLD JOIN message appears on the OLT, the OLT may forward the MLD JOIN message to the previous node again, for example, a multicast router (Multicast Router). Before forwarding the message, the OLT deletes the access loop identification extension header. If it is not the first time that the multicast address requested by the MLD JOIN message appears on the OLT, the MLD JOIN message is discarded.

Both the OLT and the ONU support the relay agent function.

Through the above operations, the access and authorization of the MLD JOIN message is implemented by using the access loop identification extension header, which ensures the network security. Further, the MLD JOIN message that carries the access loop identification extension header may further be used by the management or control node in the network to collect statistics for joining and quitting a multicast group of users. For example, a BRAS may collect statistics on which users join or quit which multicast group through the access loop identification in the MLD JOIN message.

Referring to FIG. 5, the following describes a scenario where an access node adds an access loop identification extension header to a dynamic host configuration protocol (Dynamic Host Configuration Protocol, DHCP) message according to an embodiment of the present disclosure.

Step 1: A home gateway or a user terminal (that is, DHCP client) sends a DHCP message to an access node. Taking DHCPv6 as an example, the DHCP message and the format of the IPv6 packet where the DHCP message is located are as shown in Table 6. The DHCP message includes a DHCP extension header and an option (Option).

TABLE 6

| IPv6 header (IPv6 Header) | DHCP header (DHCP Header) | Options (Options) |
| --- | --- | --- |

Step 2: The access node adds an access loop identification extension header to the IP packet where the received DHCP message is located, where the access loop identification extension header carries an access loop identification (ALI), as shown in Table 7. The access node forwards the DHCP message to an IP edge node. The access node supports the relay agent function.

TABLE 7

| IPv6 header (IPv6 Header) | Access loop identification header (Access Loop ID Header) | DHCP header (DHCP Header) | Options (Options) |
| --- | --- | --- | --- |

Step 3: After receiving the DHCP message, the IP edge node inserts the access loop identification into the DHCP message according to the access loop identification extension header in the IP packet where the DHCP message is located. For example, the IP edge node extracts the access loop identification and deletes the access loop identification extension header from the IP packet where the DHCP message is located, encapsulates the DHCP message and the access loop identification into a relay agent message, and then forwards the relay agent message to a DHCP server. Before forwarding the relay agent message, the IP edge node may authenticate or authorize the message on an AAA server according to the access loop identification. The IP edge node supports the relay agent function. Compared with the relay agent function supported by the above access node, the relay agent function supported by the IP edge node may be referred to as a second relay agent function.

The IP edge node may insert the access loop identification into the DHCP message in at least two modes as follows. The following takes DHCPv6 as an example to illustrate the two modes respectively.

Mode 1

Figure 8:
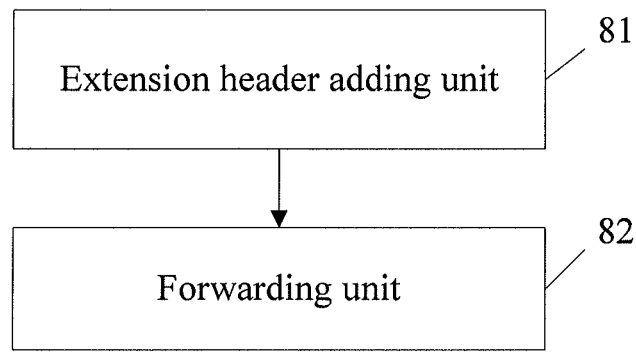
FIG. 8 is a schematic structural diagram of a terminal according to a fifth embodiment of the present disclosure.

Referring to FIG. 8, after deleting the access loop identification extension header from the received DHCPv6 message, the IP edge node encapsulates the DHCPv6 message into a relay message option (Relay Message Option), and places the message in a relay agent message (Relay Agent MSG). The relay agent message is formed by a relay agent message header (Relay Agent MSG Header) and an option (Option).

Then, the IP edge node adds the access loop identification to the relay agent message in the form of an Option, for example, interface-id option (Interface-id option) according to the access loop identification extension header in the IP packet where the DHCPv6 message is located.

TABLE 8

| IPv6 header (IPv6 Header) | Relay agent message header (Relay Agent MSG Header) | Options (Options) | Relay message option (Relay MSG option) | DHCP header (DHCP Header) | Options (Options) | Interface-id option (Interface-id option) |
| --- | --- | --- | --- | --- | --- | --- |

Mode 2

Figure 9:
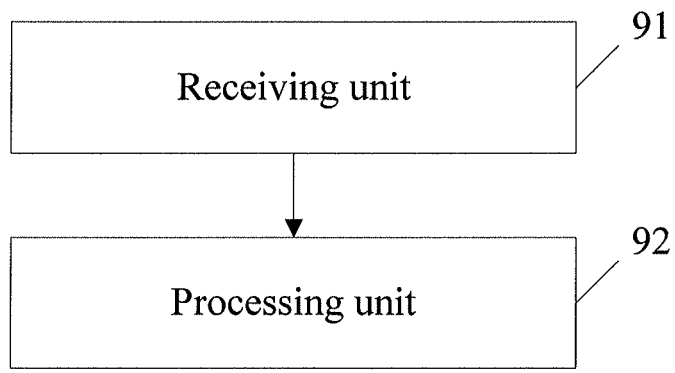
FIG. 9 is a schematic structural diagram of a network server according to a sixth embodiment of the present disclosure.

As shown in FIG. 9, after receiving a DHCPv6 message, the IP edge node extracts the access loop identification in the access loop identification extension header in the IP packet where the DHCPv6 message is located, deletes the access loop identification extension header, and directly adds the access loop identification to the DHCPv6 message in the form of an Option, for example, interface-id option.

TABLE 9

| IPv6 header (IPv6 Header) | IPv6 header (DHCP Header) | Options (Options) | Interface-id option (Interface-id option) |
| --- | --- | --- | --- |

Step 4: After receiving the DHCP message from the IP edge node, the DHCP server performs the corresponding operations according to the access loop identification. For example, the DHCP server allocates an IP address/prefix according to the access loop identification, or performs access control.

Then, the DHCP server returns a DHCP message that carries the access loop identification to the DHCP client. For example, in DHCPv6, the format of the returned message can refer to Tables 8 and Table 9.

Step 5: The DHCP server sends the returned DHCP message to the IP edge node. After receiving the DHCP message, the IP edge node adds the access loop identification extension header to the IP packet according to the access loop identification carried in the DHCP message; deletes the access loop identification information from the DHCP message or deletes the relay agent message, extracts the DHCP message that is encapsulated in the Relay Message Option in the relay agent message, and then forwards the DHCP message to the access node. For example, in DHCPv6, the format of the DHCP message can refer to Table 7.

Step 6: After receiving the DHCP message, the access node forwards the DHCP message over its corresponding access loop to the corresponding home gateway or user terminal according to the access loop identification information in the access loop identification extension header carried in the IP packet. Before the DHCP message is forwarded, the access loop identification extension header may be deleted for security.

It may be understood that, according to the embodiment of the present disclosure, only the access loop identification extension header (as shown in Table 2) may be added to the IP packet, or only the vendor class identification extension header (as shown in FIG. 4) may be added to the IP packet, or both the access loop identification extension header and the vendor class identification extension header may be added to the IP packet at the same time.

Content above describes the method for carrying the access loop identification or the vendor class identification in the IPv6 packet by using the extension header, but the method is not limited thereto. When the IPv6 packet is an ICMPv6 message, an embodiment of the present disclosure further provides a method for bearing an existing ICMPv6, and meanwhile bearing an access loop identification by using a new ICMPv6 message. The embodiment of the present disclosure takes a case where the new ICMPv6 message is an ICMPv6 relay message (ICMPv6 Relay Message) as an example for description. The specific name of the new message is not limited here.

Generally, for data security, a data sender may signs the ICMPv6 message, and a data receiver acquires, through signature verification, whether the data is tampered. When the signatures are consistent, it indicates that the data is not tampered, and is allowable and safe. If the access loop identification information is directly added to the ICMPv6 message, the completeness of the ICMPv6 message is damaged. The data receiver finds, through signature verification, that the ICMPv6 message has been changed, but fails to know whether other illegal tampering exist or not in addition to adding the access loop identification information. As regard such issue, in the embodiment of the present disclosure, the ICMPv6 message is carried in the ICMPv6 relay message, without any change to the ICMPv6 message. The data receiver extracts the ICMPv6 message from the ICMPv6 relay message, and then performs signature verification on the ICMPv6 message, so as to find whether the ICMPv6 message is tampered. Moreover, the data receiver may further obtain the access loop identification information from the ICMPv6 relay message for secure access, authentication, or authorization.

Figure 6:
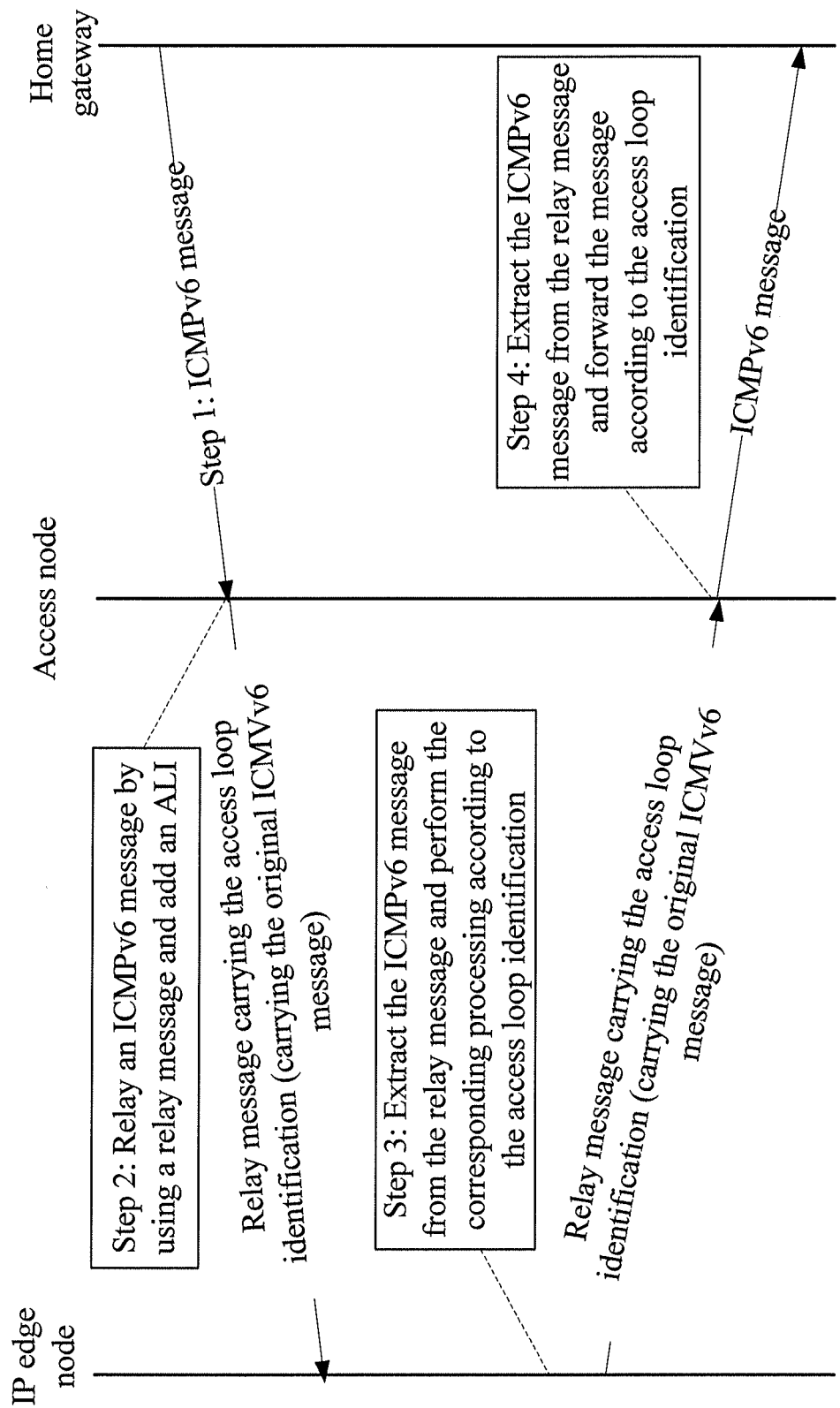
FIG. 6 is a schematic flowchart of a method of a case where a relay agent function is located in an access node according to a third embodiment of the present disclosure.

The relay agent function may be used to implement the operation of carrying the access loop identification in the ICMPv6 relay message. Here a scenario where the relay agent function is located on the access node is taken as an example for description. As shown in FIG. 6, the following steps are specifically included:

Step 1: A home gateway or a user terminal sends an ICMPv6 message to an access node. The ICMPv6 message and the format of the IPv6 packet where the ICMPv6 message is located can refer to Table 10.

TABLE 10

| IPv6 header (IPv6 Header) NextHeader = 58(ICMPv6) | ICMPv6 header (ICMPv6 Header) | Neighbor discovery message specific data (ND Message specific data) | Neighbor Discovery message options (ND Message Options) |
|---|---|---|---|

In an ICMP message, NextHeader is 58.

Step 2: The access node bears the ICMPv6 message that is received from the user terminal/home gateway in an ICMPv6 relay message, and adds an access loop identification (Access Loop ID) in the ICMPv6 relay message; the access node forwards the ICMPv6 message to an IP edge node; the value of the Code domain is set to 0, indicating the ICMPv6 packet relayed from a user to a router.

Referring to Table 11, a structure of an ICMPv6 packet that bears the ICMPv6 message and the access loop identification by using the ICMPv6 relay message is illustrated.

TABLE 11

| IPv6 header (IPv6 Header) Next Header = 58(ICMPv6) | ICMPv6 relay message header (ICMPv6 Relay Message Header) | Relay option (Relay Option) | Access loop identification option (Access Loop ID Option) |
|---|---|---|---|

The ICMPv6 relay message is formed by a relay message header (ICMPv6 Relay Message Header) and an option (Option). Table 12 illustrates a specific structure of the ICMPv6 relay message.

TABLE 12

| | 31-24 bit | 23-16 bit | 15-0 bit |
|---|---|---|---|
| 0 | Type (Type) | Code (Code) | Checksum (Checksum) |
| 1 | Client IP/MAC address option (Client IP/MAC address Option) | | |
| ... | | | |
| i | | | |
| i + 1 | IPv6 pseudo-deader option (IPv6 pseudo-header Option) | | |
| ... | | | |
| j | | | |
| j + 1 | Relay option (Relay Option) | | |
| ... | | | |
| k | | | |
| k + 1 | Access loop identification option (Access Loop ID Option) | | |
| ... | | | |
| n | | | |

The Type domain is the type of the ICMPv6 message, indicating that the message is an ICMPv6 relay message.

The Code domain indicates the relaying direction of the ICMPv6 message. The Code value 0 indicates an ICMPv6 packet relayed from a user to a router; the Code value 1 indicates relaying of an ICMPv6 packet from a router to a user.

Alternatively, the Type domain indicates an existing ICMPv6 message, and the Code domain indicates relaying of an ICMPv6 packet.

Checksum is the checksum.

Client IP/MAC address Option is used to indicate the IP/MAC address of the ICMP packet sender. Generally, the IP/MAC address is carried only when the Code value is 0.

Relay Option is mandatory and carries a relayed ICMPv6 message. The format of the ICMPv6 message is the same as that of the rest information except the IPv6 packet header in Table 10.

IPv6 pseudo-header Option (IPv6 pseudo-header Option) is used to calculate the checksum of Relay Option. The specific format of IPv6 pseudo-header Option is as shown in Table 13.

TABLE 13

| | 31-8 bit | 7-0 bit |
|---|---|---|
| 0 | Source IP address (Source Address) | |
| 1 | | |
| 2 | | |
| 3 | Destination IP address (Destination Address) | |
| 4 | | |
| 5 | | |
| 6 | | |
| 7 | | |

TABLE 13-continued

| 31-8 bit | 7-0 bit |
|---|---|
| 8 Upper-layer packet length (Upper-Layer Packet Length) | |
| 9 Zero | Next Header = 58(ICMP) |

If, before relaying, the IPv6 packet has a router extension header, the destination address in the IPv6 pseudo-header option is the final destination IP address of the router extension header. Upper-layer packet length (Upper Layer Packet Length) includes the ICMPv6 header and payload length before relaying.

The destination IP address and source IP address of the original ICMPv6 message may be used as the destination IP address and source IP address of the ICMPv6 Relay message for forwarding. In this case, the ICMPv6 Relay message may not carry the IPv6 pseudo-header option. Alternatively, the ICMPv6 relay message extracts the information of the IPv6 header where the original ICMPv6 message is located, uses it as the IPv6 pseudo-header option, carries it in the ICMPv6 relay message, and then adds a new IPv6 header before the ICMPv6 relay message, and sends the message. The destination IP address of the message is the address of the IP edge node, and the source IP address of the message is the address of the access node. Client IP/MAC address option is set to the IP/MAC address of the original ICMPv6 message.

Step 3: After receiving the ICMPv6 relay message, the IP edge node extracts the ICMPv6 message and the access loop identification that are from the user terminal/home gateway from the ICMPv6 relay message, needs to calculate the checksum of the ICMPv6 message from the user terminal/home gateway, and then performs the corresponding processing according to the access loop identifications, for example, performing authentication or authorization on the AAA server according to the access loop identification, or allocating IP address prefixes according to the access loop identification.

Then, the IP edge node returns an ICMPv6 message to the user terminal/home gateway. The ICMPv6 message also needs to be carried in the ICMPv6 relay message and the access loop identification is carried in the ICMPv6 relay message.

Finally, the IP edge node forwards the ICMPv6 relay message to the access node, where the value of the Code domain is set to 1, indicating the ICMPv6 packet routed from a router to a user.

The source IP address of the IP packet where the ICMPv6 relay message is located is the address of the IP edge node, and the destination IP address is the address of the user terminal/home gateway. In this case, the ICMPv6 relay message may not carry the IPv6 pseudo-header option. Alternatively, the source IP address of the IP packet where the ICMPv6 relay message is located is the address of the IP edge node, and the destination IP address is the address of the access node. In this case, the ICMPv6 relay message needs to carry and extract the information of the IPv6 header where the ICMPv6 message that is returned to the user terminal/home gateway is located, use it as the IPv6 pseudo-header option, and carry it in the ICMPv6 relay message. The source IP address of the IPv6 pseudo-header option is the address of the IP edge node, and the destination IP address is the address of the user terminal/home gateway.

The checksum of the ICMPv6 message of the user terminal/home gateway may be calculated and verified according to the IPv6 pseudo-header option and the ICMPv6 message header of the user terminal/home gateway. If the ICMPv6 relay message carries no IPv6 pseudo-header option, an IPv6 pseudo-header is generated according to the IPv6 header where the ICMPv6 relay message is located, and then the IPv6 pseudo-header and the ICMPv6 message of the user terminal/home gateway is verified.

Step 4: After receiving the ICMPv6 relay message, the access node extracts the IMCPv6 message returned to the user terminal/home gateway, and the access loop identification from the ICMPv6 relay message, and forwards the ICMPv6 message returned to the user terminal/home gateway over its corresponding access loop to the home gateway or the user terminal according to the access loop identification.

If the source IP address of the IP packet where the ICMPv6 relay message is located is the address of the IP edge node, and the destination IP address is the address of the user terminal/home gateway, the access node may forward the message by using the IPv6 packet where the ICMPv6 relay message is located.

If the source IP address of the IP packet where the ICMPv6 relay message is located is the address of the IP edge node, and the destination IP address is the address of the access node, the access node extracts the IPv6 pseudo-header from the ICMPv6 relay message, so as to construct a new IPv6 header. The source IP address is the address of the IP edge node, and the destination IP address of the address of the user terminal/home gateway. Then, the ICMPv6 message returned to the user terminal/home gateway is sent.

According to the solution provided in the embodiments of the present disclosure, the IPv6 extension header carries the access line information and/or the vendor information, so that the device receiving the IPv6 packet can perform access, authentication, and authorization of the IPv6 packet by using the access line information and/or vendor information, or allocate different IPv6 address prefixes to different terminals. According to the solution of the embodiment of the present disclosure, a secure access, authentication, and authorizations can be ensured in an IPv6 network, and different IPv6 address prefixes are allocated to different terminals. Therefore, normal routing of a network is ensured.

Figure 7:
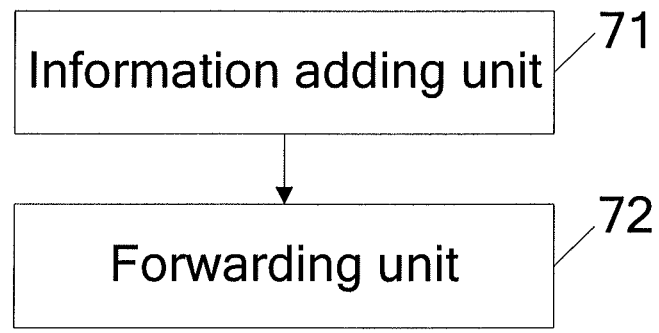
FIG. 7 is a schematic structural diagram of a network device according to a fourth embodiment of the present disclosure.

A fourth embodiment of the present disclosure provides a network device. As shown in FIG. 7, the network device includes:

an information adding unit 71, configured to add access line information to an IPv6 packet; and a forwarding unit 72, configured to forward the IPv6 packet to which the information adding unit 71 adds the access line information.

Further, the information adding unit 71 is specifically configured to add at least one IPv6 extension header to the IPv6 packet, so as to add access line information to the IPv6 packet; and the added IPv6 extension header includes an access loop identification, a next header Next Header, and the length of an extension header, where the Next Header indicates information of a next extension header, and the access line information includes an access loop identification.

Or, the information adding unit 71 is specifically configured to bear an ICMPv6 message in an IMCPv6 relay message, so as to add access line information to the IPv6 packet. The IPv6 packet is the ICMPv6 message; the ICMPv6 relay message bears an access loop identification; and the access line information includes the access loop identification.

Further, the information adding unit 71 includes a current level adding module and an upper level adding module.

The upper level adding module is configured to add an upper level IPv6 extension header to the IPv6 packet, and the current level adding module is configured to add a current level IPv6 extension header to the IPv6 packet in at least one of the following modes:

directly adding the current level first IPv6 extension header after the upper level first IPv6 extension header, where the Next Header in the upper level first IPv6 extension header indicates the current level IPv6 extension header;

or, modifying the upper level IPv6 extension header and adding a current level access loop identification to the access loop identification of the upper level first IPv6 extension.

Further, the device may further includes: a receiving and deleting unit, configured to receive an IPv6 packet of the first IPv6 extension header, delete the first IPv6 extension header in the IPv6 packet, and forward the IPv6 packet.

In the apparatus embodiments of the present disclosure, the specific working modes of all function modules and units can refer to the method embodiments of the present disclosure. All the function modules and units in the apparatus embodiments of the present disclosure may be either independently implemented or integrated in one or multiple units. For example, the above network device may be implemented by an access node and/or an IP edge node in an access network.

According to the solution provided in the embodiments of the present disclosure, the IPv6 extension header carries the access line information and/or the vendor information, so that the device receiving the IPv6 packet can perform access, authentication, and authorization of the IPv6 packet by using the access line information and/or vendor information, or allocate different IPv6 address prefixes to different terminals. According to the solution of the embodiment of the present disclosure, a secure access, authentication, and authorizations can be ensured in an IPv6 network, and different IPv6 address prefixes are allocated to different terminals. Therefore, normal routing of a network is ensured.

A fifth embodiment of the present disclosure provides a terminal. As shown in FIG. 8, the terminal includes:

an extension header adding unit 81, configured to add at least one IPv6 extension header to an IPv6 packets, where the IPv6 extension header carries vendor information; and a forwarding unit 82, configured to forward the IPv6 packet to which the extension header adding unit 81 adds the IPv6 extension header.

Further, the IPv6 extension header added by the extension header adding unit 81 includes a vendor class identification, a Next Header, and the length of an extension header, where the Next Header indicates information of a next extension header, and the vendor information includes a vendor class identification.

In the apparatus embodiments of the present disclosure, the specific working modes of all units of the terminal can refer to the method embodiments of the present disclosure. All the function modules and units in the apparatus embodiments of the present disclosure may be either independently implemented or integrated in one or multiple units.

According to the solution provided in the embodiments of the present disclosure, the IPv6 extension header is added to the IPv6 packet, and the access line information and/or the vendor information is carried in the IPv6 extension header, so that the access, authentication, and authorization of the IPv6 packet is performed by using the access line information and/or vendor information, or different IPv6 address prefixes are allocated to different terminals. According to the solution of the embodiment of the present disclosure, a secure access, authentication, and authorizations can be ensured in an IPv6 network, and different IPv6 address prefixes are allocated to different terminals. Therefore, normal routing of a network is ensured.

A sixth embodiment of the present disclosure further provides a network server. As shown in FIG. 9, the server includes:

a receiving unit 91, configured to receive an IPv6 packet that carries access line information or vendor information, so as to obtain the access line information or the vendor information; and a processing unit 92, configured to search for a correspondence according to the access line information or the vendor information, so as to perform a corresponding operation on the IPv6 packet.

Further, the receiving unit 91 is configured to receive the IPv6 packet that has at least one IPv6 extension header, where the IPv6 extension header carries the access line information or the vendor information; and obtain the access line information or the vendor information according to the IPv6 extension header; or receive the IPv6 packet that bears an ICMPv6 message, where the IPv6 packet carries the ICMPv6 message and the access line information in an ICMPv6 relay message; and extract the access line information from the ICMPv6 relay message.

Further, the processing unit 92 is further configured to search for a first correspondence according to the access line information or the vendor information, so as to perform access, authentication, or authorization of the e IPv6 packet. The IPv6 extension header is a first IPv6 extension header; the first IPv6 extension header carries an access loop identification, a next header Next Header, and the length of the extension header; and the access line information includes the access loop identification; or The processing unit 92 is further configured to search for a second correspondence according to the access line information or the vendor information, so as to allocate an IPv6 address prefix to the IPv6 packet. The IPv6 extension header is a second IPv6 extension header; the second IPv6 extension header carries a vendor class identification, a Next Header, and the length of the extension header; and the vendor information includes the vendor class identification.

The processing unit 92 may concurrently have the two functions described above.

In the apparatus embodiments of the present disclosure, the specific working modes of all units of the network server can refer to the method embodiments of the present disclosure. All the function modules and units in the apparatus embodiments of the present disclosure may be either independently implemented or integrated in one or multiple units.

According to the solution provided in the embodiments of the present disclosure, the IPv6 packet carries the access line information and/or the vendor information, so that the device receiving the IPv6 packet can perform access, authentication, and authorization of the IPv6 packet by using the access line information and/or vendor information, or allocate different IPv6 address prefixes to different terminals. According to the solution of the embodiment of the present disclosure, a secure access, authentication, and authorizations can be ensured in an IPv6 network, and different IPv6 address prefixes are allocated to different terminals. Therefore, normal routing of a network is ensured.

An embodiment of the present disclosure further provides an IPv6 network system, where the system includes a terminal and/or a network device, and a network server.

The terminal is configured to add at least one IPv6 extension header to an IPv6 packet, where the IPv6 extension header carries vendor information; and forward the IPv6 packet added with the IPv6 extension header.

The network device is configured to add at least one IPv6 extension header to an IPv6 packet, where the IPv6 extension header carries access line information; and forward the IPv6 packet added with the IPv6 extension header.

The network server is configured to receive the IPv6 packet that carries the access line information or the vendor information; and search for a correspondence according to the access line information or the vendor information, so as to perform a corresponding operation on the IPv6 packet.

According to the solution provided in the embodiments of the present disclosure, the IPv6 packet carries the access line information and/or the vendor information, so that the device receiving the IPv6 packet can perform access, authentication, and authorization of the IPv6 packet by using the access line information and/or vendor information, or allocate different IPv6 address prefixes to different terminals. According to the solution of the embodiment of the present disclosure, a secure access, authentication, and authorizations can be ensured in an IPv6 network, and different IPv6 address prefixes are allocated to different terminals. Therefore, normal routing of a network is ensured.

Those skilled in the art may clearly understand that the embodiments of the present disclosure may be implemented through hardware on a necessary universal hardware platform. Based on such understanding, the solution of the present disclosure or part that makes contributions to the prior art may be essentially embodied in the form of a software product. The computer software product may be stored in a storage medium, such as a ROM/RAM, a magnetic disk, or an optical disk. The software product includes a number of instructions used to instruct a computer device (such as a personal computer, a server, or a network device) to perform the methods according to the embodiments of the present disclosure.

The above descriptions are merely exemplary embodiments of the present disclosure, but the protection scope of the present disclosure is not limited thereto. Variations or replacements readily conceivable by persons skilled in the prior art within the technical scope disclosed in the present disclosure should fall within the protection scope of the present disclosure. Therefore, the protection scope of the present disclosure is subjected to the appended claims.

What is claimed is:

1. A method for processing an Internet Protocol version 6 (IPv6) packet, comprising:
   receiving, by an access node, a first IPv6 packet from a terminal;
   adding, by the access node, a first IPv6 extension header to the first IPv6 packet to generate a second IPv6 packet, wherein the first IPv6 extension header carries access line information, a next header and the length of an extension header; the next header indicates information of a next extension header;
   forwarding, by the access node, the second IPv6 packet to an IP edge node;
   receiving, by the IP edge node, the second IPv6 packet;
   obtaining, by the IP edge node, the access line information from the second IPv6 packet, and deleting the first IPv6 extension header from the second IPv6 packet to obtain the first IPv6 packet;
   generating, by the IP edge node, a third IPv6 packet according to the access line information and the first IPv6 packet; and
   forwarding, by the IP edge node, the third IPv6 packet to a network server,
   wherein the first IPv6 packet comprises a first dynamic host configuration protocol (DHCP) message.

2. The method according to claim 1,
   wherein adding the first IPv6 extension header to the first IPv6 packet comprises:
   adding, by a first relay agent at the access node, the first IPv6 extension header in the first IPv6 packet;
   wherein after forwarding, by the access node, the second IPv6 packet to an IP edge node, the method further comprises:
   adding, by a second relay agent at the IP edge node, a second IPv6 extension header to the second IPv6 packet in at least one of the following modes:
   adding, by the second relay agent directly, the second IPv6 extension header after the first level IPv6 extension header, wherein the next header in the first level IPv6 extension header indicates the second IPv6 extension header; and
   modifying, by the second relay agent, the first IPv6 extension header, and adding a second access line information to the access line information of the first IPv6 extension header.

3. A method for processing an Internet Protocol version 6 (IPv6) packet, comprising:
   receiving, by an IP edge node, a second IPv6 packet that carries access line information from an access node; wherein the second IPv6 packet comprises a first IPv6 extension header comprising the access line information and a first IPv6 packet comprising a first dynamic host configuration protocol (DHCP) message;
   obtaining, by the IP edge node, the access line information from the second IPv6 packet, and deleting the first IPv6 extension header from the second IPv6 packet to obtain the first IPv6 packet;
   generating, by the IP edge node, a third IPv6 packet according to the access line information and the first IPv6 packet; and
   forwarding, by the IP edge node, the third IPv6 packet to a network server.

4. The method according to claim 3,
   wherein generating the third IPv6 packet according to the access line information and the first IPv6 packet comprises:
   encapsulating, by the IP edge node, the access line information and the first DHCP message in a relay message option of a relay agent message; and
   wherein forwarding the third IPv6 packet to the network server comprises:
   forwarding the relay agent message to the network server.

5. The method according to claim 3, wherein:
   generating the third IPv6 packet according to the access line information and the first IPv6 packet comprises:
   directly adding, by the IP edge node, an option to the first IPv6 packet to generate the third IPv6 packet; wherein the option comprises the access line information.

6. The method according to claim 3, wherein after forwarding, by the IP edge node, the third IPv6 packet to the network server, the method further comprises:
   receiving, by the IP edge node, a fourth IPv6 packet sent by the network server, wherein the fourth IPv6 packet comprises a second DHCP message and carries the access line information;
   deleting, by the IP edge node, the access line information from the fourth IPv6 packet; and
   adding, by the IP edge node, the first IPv6 extension header which comprises the access line information to the fourth IPv6 packet to generate a fifth IPv6 packet, and forwarding the fifth IPv6 packet.

7. An Internet Protocol version 6 (IPv6) network system comprising an access node and an IP edge node, wherein:
the access node is configured to receive a first IPv6 packet from a terminal; add a first IPv6 extension header to the first IPv6 packet to generate a second
IPv6 packet, wherein the first IPv6 extension header carries access line information, a next header and the length of an extension header; the next header indicates information of a next extension header; the iPv6 packet comprises a first dynamic host configuration protocol (DHCP) message; and forward the second IPv6 packet to the IP edge node; and
the IP edge node is configured to receive the second IPv6 packet; obtain the access line information from the second IPv6 packet, delete the first IPv6 extension header from the second IPv6 packet to obtain the first IPv6 packet; generate a third IPv6 packet according to the access line information and the first IPv6 packet and forward the third IPv6 packet to a network server.

8. The IPv6 network system according to 7, wherein the access node comprises a first relay agent and the IP edge node comprises a second relay agent,
the first relay agent is configured to add the first IPv6 extension header in the first IPv6 packet;
the second relay agent is configured to add a second IPv6 extension header to the second IPv6 packet in at least one of the following modes:
add the second IPv6 extension header directly after the first level IPv6 extension header, wherein the next header in the first level IPv6 extension header indicates the second IPv6 extension header; and
modify the first IPv6 extension header, and adding a second access line information to the access line information of the first IPv6 extension header.

\* \* \* \* \*